(12) United States Patent
Harvey et al.

(10) Patent No.: US 7,484,530 B2
(45) Date of Patent: Feb. 3, 2009

(54) DUAL PURPOSE ALIGNMENT AND FLUID COUPLING

(75) Inventors: Rex J. Harvey, Mentor, OH (US); Richard B. Hodges, Ojai, CA (US); Joseph Marban, Newbury Park, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 11/379,705

(22) Filed: Apr. 21, 2006

(65) Prior Publication Data

US 2006/0243332 A1   Nov. 2, 2006

Related U.S. Application Data

(60) Provisional application No. 60/674,015, filed on Apr. 22, 2005.

(51) Int. Cl.
*F16L 37/32* (2006.01)
(52) U.S. Cl. .................... 137/614.03; 137/614.04; 251/149.1; 251/149.6; 285/320
(58) Field of Classification Search ............ 137/614.03, 137/614.04, 614.05, 614; 285/320, 305, 285/307; 251/149.1, 149.6
See application file for complete search history.

(56) References Cited

U.S. PATENT DOCUMENTS

| 3,917,370 | A |  | 11/1975 | Thornton et al. |
| 4,002,186 | A |  | 1/1977 | Fink et al. |
| 4,142,740 | A |  | 3/1979 | Wilms |
| 4,343,526 | A |  | 8/1982 | Hobson et al. |
| 4,566,489 | A |  | 1/1986 | Knapp et al. |
| 4,619,042 | A |  | 10/1986 | Halstead |
| 4,682,833 | A |  | 7/1987 | Ferchau et al. |
| 4,691,429 | A |  | 9/1987 | Goodsmith |
| 4,793,053 | A |  | 12/1988 | Zuccaro et al. |
| 4,802,694 | A |  | 2/1989 | Vargo |
| 4,920,636 | A |  | 5/1990 | Eck |
| 4,924,909 | A | * | 5/1990 | Wilcox ................. 137/614.05 |
| 4,934,943 | A |  | 6/1990 | Klein et al. |
| 4,935,695 | A |  | 6/1990 | Hayes et al. |
| 4,956,913 | A |  | 9/1990 | Eck |
| 4,978,150 | A |  | 12/1990 | Schoot |
| 5,082,391 | A |  | 1/1992 | Florida |
| 5,083,818 | A |  | 1/1992 | Schoot |

(Continued)

*Primary Examiner*—Kevin L Lee
(74) *Attorney, Agent, or Firm*—Renner, Otto, Boisselle & Sklar, LLP

(57) ABSTRACT

A fluid coupling for providing a fluid connection between an electronic module and a rack having an electrical connector to which the electronic module is connected, comprises a male coupler and a mating female coupler. The male coupler includes a male coupler body and a nipple, and the female coupler includes a female coupler body and a socket for receiving the nipple to establish a sealed fluid flow path between the male and female couplers when the couplers are connected together. At least one of the nipple and socket is mounted in the respective coupler body for limited transverse movement relative to the respective coupler body, and at least one of the couplers includes an axially extending spud that will initially telescopically engage the other coupler to initially coaxially align the male and female couplers within a first tolerance range and then to telescopically engage an alignment surface on the coupler body of the other coupler to coaxially align the male and female coupler bodies within a second tolerance smaller than the first tolerance.

19 Claims, 5 Drawing Sheets

U.S. PATENT DOCUMENTS

| | | |
|---|---|---|
| 5,123,447 A | 6/1992 | Calvin et al. |
| 5,131,859 A | 7/1992 | Bowen et al. |
| 5,167,398 A | 12/1992 | Wade et al. |
| 5,293,902 A | 3/1994 | Lapierie |
| 5,294,092 A | 3/1994 | Wade et al. |
| 5,326,286 A | 7/1994 | Bixler et al. |
| 5,385,481 A | 1/1995 | Kotyuk |
| 5,406,980 A * | 4/1995 | Allread et al. ......... 137/614.03 |
| 5,446,960 A | 9/1995 | Isaacs et al. |
| 5,456,018 A | 10/1995 | Irlbeck et al. |
| 5,509,468 A | 4/1996 | Lopez |
| 5,566,639 A | 10/1996 | McKinstry et al. |
| 5,575,250 A | 11/1996 | Van Dyne, II |
| 5,658,156 A | 8/1997 | Henderson et al. |
| 5,667,411 A | 9/1997 | O'Sullivan et al. |
| 5,676,405 A | 10/1997 | Reed |
| 5,713,755 A | 2/1998 | Koopman et al. |
| 5,738,059 A | 4/1998 | Van Dyne, II |
| 5,769,668 A | 6/1998 | Tondreault |
| 5,788,531 A | 8/1998 | Wright et al. |
| 5,791,042 A | 8/1998 | Baum et al. |
| 5,800,199 A | 9/1998 | Wright et al. |
| 5,827,077 A | 10/1998 | Fukuda |
| 5,890,923 A | 4/1999 | Wright et al. |
| 5,961,339 A | 10/1999 | Koopman et al. |
| 6,116,920 A | 9/2000 | Yu et al. |
| 6,273,732 B1 | 8/2001 | Johnescu et al. |
| 6,276,676 B1 | 8/2001 | Martinez et al. |
| 6,280,202 B1 | 8/2001 | Alden, 3rd et al. |
| 6,298,876 B1 | 10/2001 | Bogdonoff et al. |
| 6,361,335 B1 | 3/2002 | Calanni et al. |
| 6,368,146 B2 | 4/2002 | Abbott |
| 6,371,657 B1 | 4/2002 | Chen et al. |
| 6,616,469 B2 | 9/2003 | Goodwin et al. |
| 6,688,650 B2 * | 2/2004 | Novotny ..................... 285/13 |
| 6,807,056 B2 | 10/2004 | Kondo et al. |

* cited by examiner

DUAL PURPOSE ALIGNMENT AND FLUID COUPLING

RELATED APPLICATION

This application claims the benefit of U.S. Provisional Application No. 60/674,015 filed Apr. 22, 2005, which is hereby incorporated herein by reference in its entirety.

FIELD OF THE INVENTION

The invention herein described relates generally to alignment and fluid couplings and more particularly to a dual purpose alignment and fluid coupling particularly suited for use with fluid-cooled daughter board and rack assemblies.

BACKGROUND

A commonly used electronic packaging process is for electrical "daughter" modules, such as circuit boards, to be plugged perpendicularly into respective sockets on a "motherboard". The term motherboard is often used synonymously with the term backplane to describe a circuit board that contains sockets into which other circuit boards can be plugged in. The sockets provide both a physical mount and an electrical interconnect between the daughter boards (modules) and the backplane (motherboard). Usually the backplane is incorporated into rack that may include a chassis or an enclosure that surrounds and protects the circuit boards. The rack may be supplied with guides such as slots for guiding the boards into proper position for mating with the sockets and further to support the daughter boards with respect to the enclosure or chassis.

More recently, electronic modules have used high density electrical connectors. The previously used guide slots usually are not accurate enough to ensure proper seating and mating of the connector contacts at the leading edge of the module with the sockets in the back plane. Consequently, pin and socket alignment devices have been employed to precisely register the leading edge of a module with the respective socket.

Unrelated to the alignment problem is another problem affecting present day electronic modules, such other problem being heat. More modern electronic devices have ever increasing density and this results in exponential growth of waste heat. Cooling fans have been employed to cool electronic devices, but newer designs have high heat fluxes that cannot be adequately addressed by forced air cooling. Consequently, more designers are turning to liquid cooling. This involves the use of fluid couplings between the modules and the rack. One approach is to add blind fluid quick-connect couplings to the modules and rack. To accommodate the couplings along with the required alignment pins and sockets, the modules have been made wider. This has the undesirable drawback that the slots must be made oversized and no longer will the normal sized cards fit in the rack.

SUMMARY OF THE INVENTION

The present invention provides a dual purpose alignment and fluid coupling that eliminates the need for separate fluid couplings and alignment pins and sockets. More particularly, the present invention uniquely provides a fluid coupling with an alignment feature that eliminates the need for the previously required alignment pins and sockets.

According to one aspect of the invention, a fluid coupling for providing a fluid connection between an electronic module and a rack having an electrical connector to which the electronic module is connected, comprises a male coupler and a mating female coupler. The male coupler includes a male coupler body and a nipple, and the female coupler includes a female coupler body and a socket for receiving the nipple to establish a sealed fluid flow path between the male and female couplers when the couplers are connected together. At least one of the nipple and socket is mounted in the respective coupler body for limited transverse movement relative to the respective coupler body, and at least one of the couplers includes an axially extending spud that will initially telescopically engage the other coupler to initially coaxially align the male and female couplers within a first tolerance range and then to telescopically engage an alignment surface on the coupler body of the other coupler to coaxially align the male and female coupler bodies within a second tolerance smaller than the first tolerance.

In a particular embodiment, the other coupler may include a receptacle for telescopically receiving and concentrically positioning the spud, or the spud may include a receptacle for receiving the other coupler body and particularly a locating spud or extension of the other coupler body.

The fluid coupling may be used in combination with the electronic module and the rack, one of the couplers being provided on the electronic module and the other on the rack. The electronic module may include at an edge thereof an electrical connector for mating with the electrical connector of the rack, and the fluid coupling may be provided at the module edge at one end of the electrical connector of the module and another fluid coupling may be provided at an opposite end of the electrical connector of the module. The fluid couplings may function to align the electrical connectors of the module and rack within the second tolerance.

The invention also provides a male coupler for use in the fluid coupling and a female coupler for use in the fluid coupling.

According to another aspect of the invention, a fluid coupling for providing a fluid connection between an electronic module and a rack having an electrical connector to which the electronic module is connected, comprises a male coupler including a male coupler body and a mating female coupler including a female coupler body. The male coupler body and female coupler bodies include respective alignment devices telescopically engageable with one another for coaxially aligning the male and female coupler bodies, and the male and female couplers respectively include radially inwardly of the alignment devices a nipple and a socket for receiving the nipple to establish a sealed fluid flow path between the male and female couplers when connected together.

According to a further aspect of the invention, a fluid coupling device for providing a fluid connection between an electronic module and a rack having an electrical connector to which the electronic module is connected, comprises a male coupler and a mating female coupler. The male coupler includes a nipple, and the female coupler includes a socket for receiving the nipple to establish a sealed fluid flow path between the male and female couplers when connected together. The female coupler has an axially extending alignment spud protruding axially beyond the socket, and the male coupler includes an alignment body from which the nipple projects. The spud protrudes axially beyond the socket such that it will initially engage therein the nipple of the male coupler to initially coaxially align the male and female couplers within a first tolerance range prior to contact between the nipple and socket and then to engage the alignment body of the male coupler to coaxially align the male and female couplers within a second tolerance closer than the first tolerance.

According to yet another aspect of the invention, a fluid coupling device for providing a fluid connection between an electronic module and a rack having an electrical connector to which the electronic module is connected, comprises a male coupler and a mating female coupler, the male coupler including a nipple, the female coupler including a socket for receiving the nipple to establish a sealed fluid flow path between the male and female couplers when connected together. The female coupler has an axially extending alignment spud located radially outwardly of the receptacle and protruding axially beyond the socket, and the male coupler includes a body having an alignment surface for cooperating with an alignment surface on the spud to coaxially align the male and female couplers during axial mating of the male and female couplers. The alignment surface on at least one of the spud and body has a leading beveled surface and a trailing centering surface respectively for engaging the alignment surface on the other of the spud and body to initially coaxially align the male and female couplers within a first tolerance range prior to contact between the nipple and socket and then to finally coaxially align the male and female couplers when the nipple and a socket are sealingly coupled together.

The foregoing and other features of the invention are hereinafter more fully described and particularly pointed out in the claims, the following description setting forth in detail certain illustrative embodiments of the invention, these being indicative, however, of but a few of the various ways in which the principles of the invention may be employed.

DETAILED DESCRIPTION

Figure 1:
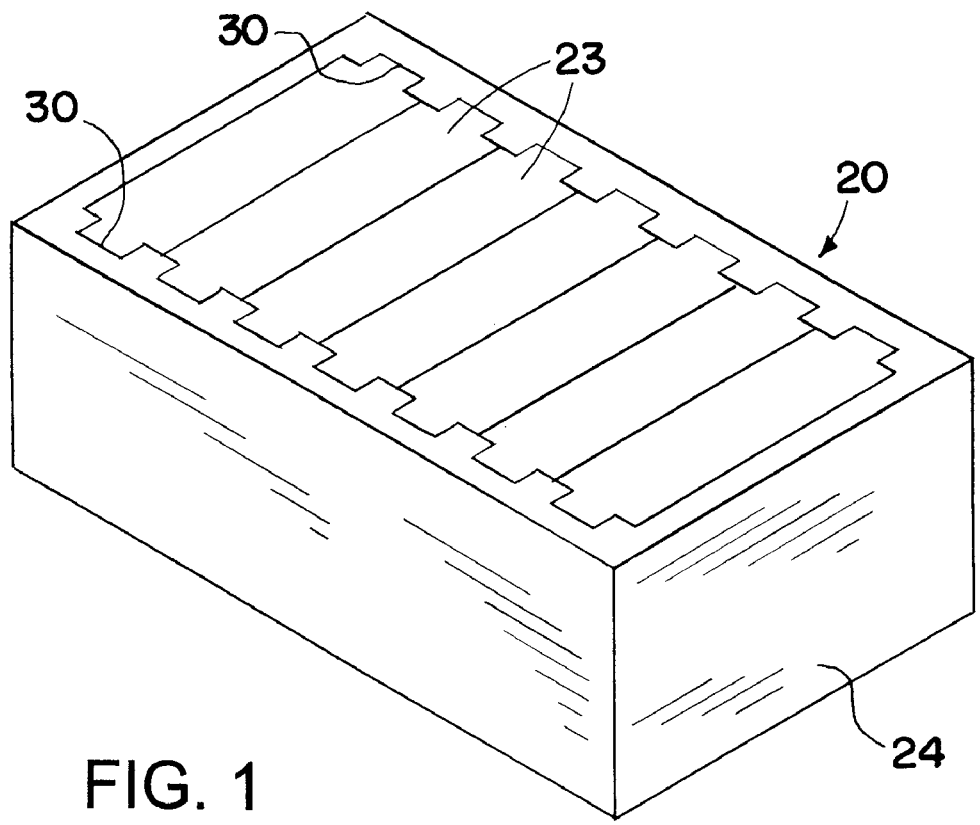
FIG. 1 is a perspective view showing a plurality of electronic modules plugged into a rack.
Figure 2:
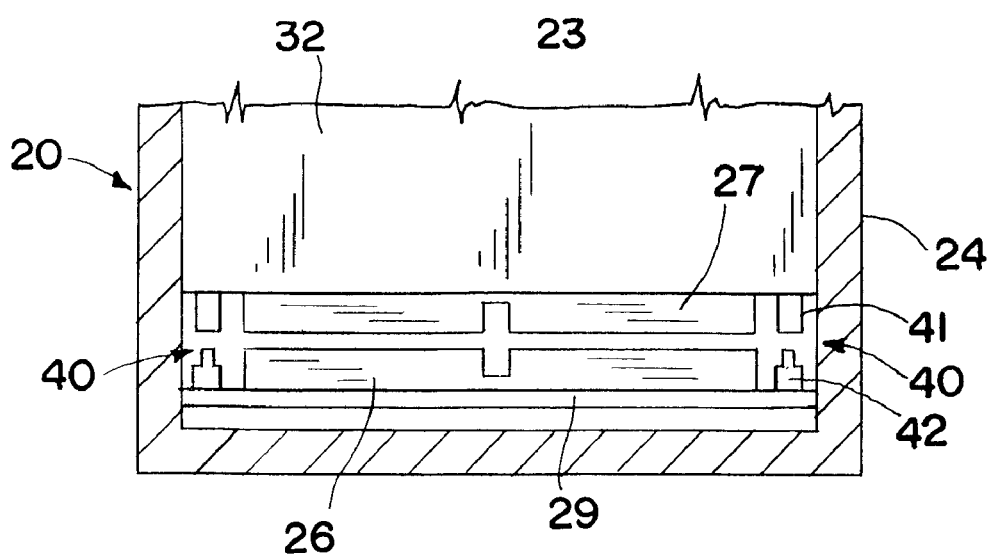
FIG. 2 is a cross-sectional view showing one of the electronic modules just prior to be being plugged into a socket in the rack, which electronic module and rack are equipped with respective halves of a dual purpose alignment and fluid coupling.

Referring now to the drawings, and initially to FIGS. 1 and 2, a rack 20 has plugged therein one or more electronic modules 23. The electronic modules may be arranged in one or more rows, or in different patterns as may be desired. The rack may include an open-sided enclosure 24 that has at the blind side thereof, electrical connectors 26 that mate with electrical connectors 27 of the modules to establish an electrical interconnect between the electronic modules and the rack. The electrical connectors in the rack typically will be sockets mounted to a backplane 29 of the rack for mating with electrical connectors of the modules, which may be, for example, pin connectors or card edge connectors containing pad contacts. The rack may be provided with guide slots 30 for guiding the edges of the modules during insertion into the rack and for supporting the modules once inserted in the rack along with the physical connection between the electrical connectors of the modules and rack.

The electronic modules 23 are of a type that are supplied with a fluid such as for cooling (or heating) electronic components contained in the modules. The modules will typically have an fluid-tight interior enclosure 32 in which the electronic components are housed. The electronic components may be mounted to a circuit board that may protrude beyond the enclosure to provide a card edge for insertion into a respective socket of the rack. Fluid is supplied to and/or from the module by one or more fluid couplings 40 including one half 41, such as a female half, on the module and the other half 42, such as a male half, on the rack, or vice versa. In a typical arrangement like that shown, a coupling may be provided at opposite ends of the blind edge of the module at which are also located the electrical connector or connectors 27 of the module that mate with the electrical connector or connectors 26 of the rack when the module is plugged into the rack. One coupling may be used to supply fluid, such as a coolant liquid, to the module and the other for return of the fluid from the module. The operative fluid can be any liquid or gas suitable for the intended application. For example, in the illustrated embodiment, the operative fluid can be a heat-transfer liquid used to cool (or in some applications heat) the electronic devices in the module.

Figure 3:
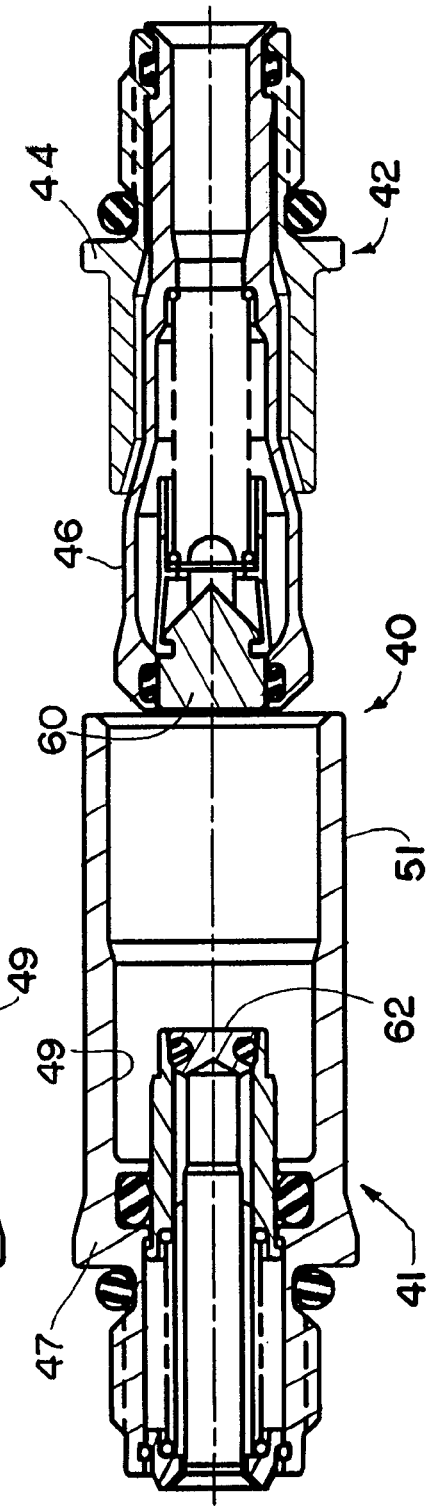
FIG. 3 is a cross-sectional view of an exemplary dual purpose alignment and fluid coupling according to the principles of the present invention, showing the male and female halves thereof just prior to insertion of one into the other.
Figures 6, 7:
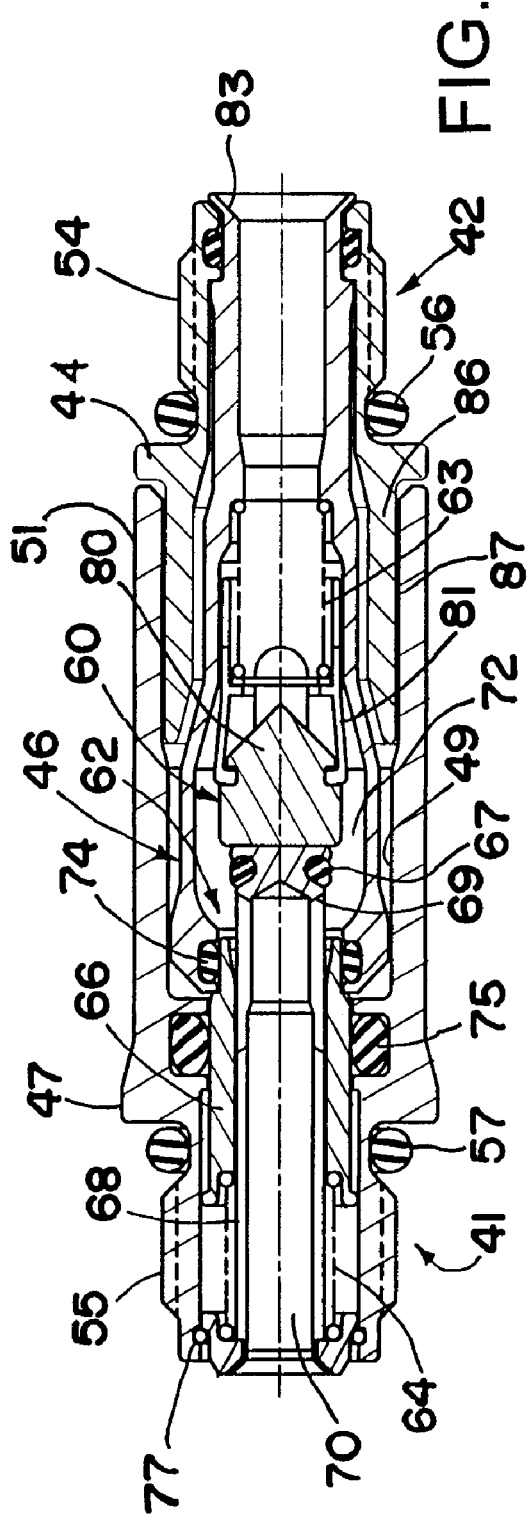
FIG. 6 is an enlargement of FIG. 5, with the coupling halves shown fully mated.
FIG. 7 is a cross-sectional view of a modified version of the fluid coupling shown in FIG. 6.

Referring now to FIGS. 3 and 6, the exemplary fluid coupling 40 according to the principles of the invention can be seen in greater detail. Generally the fluid coupling comprises a male coupler 42 and a mating female coupler 41. The male coupler includes a male coupler body 44 and a nipple 46, and the female coupler includes a female coupler body 47 and a socket 49 for receiving the nipple to establish a sealed fluid flow path between the male and female couplers when the couplers are connected together. As is preferred, at least one of the nipple and socket is mounted in the respective coupler body for limited transverse movement relative to the respective coupler body. In accordance with the principles of the present invention, at least one of the couplers includes an axially extending spud 51 that will initially telescopically engage the other coupler to initially coaxially align the male and female couplers within a first tolerance range and then to telescopically engage an alignment surface on the coupler body of the other coupler to coaxially align the male and female coupler bodies within a second tolerance smaller than the first tolerance.

Although the male and female couplers can be provided in any suitable manner in or on the module and rack, preferably the coupler bodies 44 and 47 respectively have fitting end portions 54 and 55 that are threaded for threaded connection in ports provided in the module housing and rack structure. Alternative means of attachment may be employed if desired, such as a press fit connection. Preferably seals 56 and 57 are provided as needed to prevent leakage.

As shown, the nipple 46 may include a normally closed poppet valve 60 that is openable through interaction with the female coupler when the nipple is coupled in the socket. Likewise, the socket may include a normally closed poppet valve 62 that is openable through interaction with the nipple when the nipple is coupled in the socket. In the illustrated embodiment, the poppet valves 60 and 62 are normally biased closed by springs 63 and 64.

Figure 5:
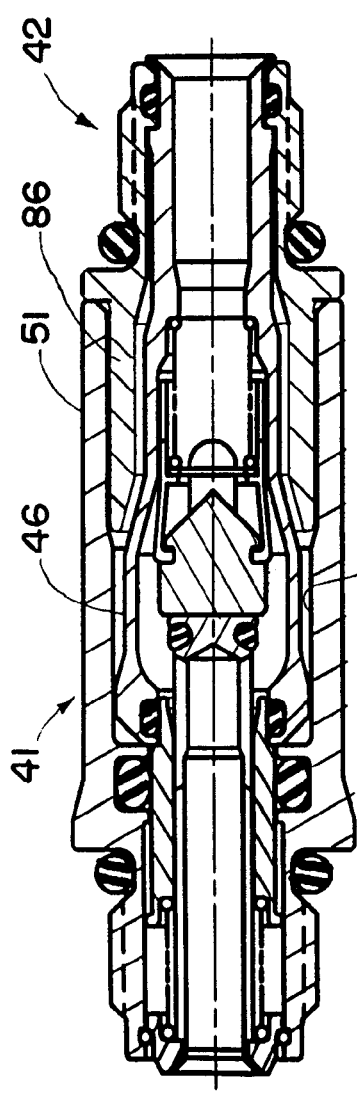
FIG. 5 is a cross-sectional view of the fluid coupling of FIG. 3 at full alignment.

When the nipple is inserted into the socket as shown in FIG. 6, the end of the nipple 46 will engage a shoulder on a tubular valve member 66 and move the tubular valve member axially off its valve seat formed by an annular seal 67 on a tubular center post 68. When the tubular valve member is unseated as shown in FIG. 5, fluid communication is established, via one or more openings 69 in the side wall of the post, between the interior flow passage 70 in the post and an interior chamber 72 in the nipple that will then be received in the socket of the female coupler and sealed to the tubular valve member by an annular seal 74. In the illustrated embodiment, the tubular valve member is telescopically guided along the post and sealed at its outer diameter to an interior bore of the female coupler body by an annular seal 75. The post is axially retained at its fitting end by a retaining ring or clip 77 fixed in a groove in the female coupler body. The valve assembly is retained in the female coupler in the opposite direction by a radially outwardly disposed shoulder at the inner end of the tubular valve member that engages against a radially inner shoulder of the female coupler body.

As seen in FIG. 6, the annular seal 74 on the inner diameter of the nipple 46 surrounds an end opening in the nipple that is normally closed by a valve member 80 that is resiliently biased by the spring 63 or other suitable means to a position seated within the annular seal 74 of the nipple. The closed position of the valve member is defined by engagement of the radially protruding end of a clip-like shuttle 81 against the inner side of a nipple end wall including the end opening. The shuttle is telescopically movable within an interior passage of the nipple that connects the chamber to a fitting end of the nipple. The fitting end of the nipple is staked at 83 or otherwise suitably fixed in the male coupler body at the fitting end thereof.

As will be appreciated, the nipple has a certain compliance associated therewith since it is radially unrestrained over a major portion of its length, i.e., a substantial portion of the length thereof outwardly of its staked end is spaced radially from an interior wall of the male coupler body. Thus, the coupling end of the nipple can move transversely, i.e., "float", a limited amount relative to the male coupling body. While it is preferred that the compliance be associated with the nipple, alternatively or additionally, the socket of the female coupling half could be provided with such transverse compliance by forming the socket separate from the female coupler body and allowing the socket to "float" within the female coupler body.

The above-described nipple and socket are of a known construction. As will be appreciated, other nipple and socket constructions may be employed without departing from the principles of the present invention.

As above indicated, and in accordance with the principles of the present invention, at least one of the couplers includes the axially extending spud 51 that will initially telescopically engage the other coupler to initially coaxially align the male and female couplers within a first tolerance range and then to telescopically engage an alignment surface on the coupler body of the other coupler to coaxially align the male and female coupler bodies within a second tolerance smaller than the first tolerance. In the exemplary coupling shown in FIGS. 3-6, the spud is formed by a tubular, more particularly cylindrical, extension of the female coupling body 47 that extends axially beyond the socket 49 in the female body and forms a receptacle. In the illustrated embodiment, the male coupler body also has a tubular portion 86 (also herein referred to as a second spud or locating extension) that surrounds a portion of the nipple and forms a pin-like structure that has a cylindrical locating surface 87 at its outer diameter for telescopically fitting within the cylindrical female spud 51 within a tolerance sufficient to ensure proper connection between the electrical connector or connectors of the module (FIGS. 1 and 2) with the electrical connector or connectors of the rack (FIGS. 1 and 2) and further to align properly the nipple with the socket to avoid any misalignment or side loads that may cause a leak between the nipple and socket. In addition, the cylindrical spud cooperates initially with the nipple that projects beyond the cylindrical extension (or spud) of the male coupler body to effect initial rough alignment of the couplers as the nipple is being inserted into the socket.

Figure 4:
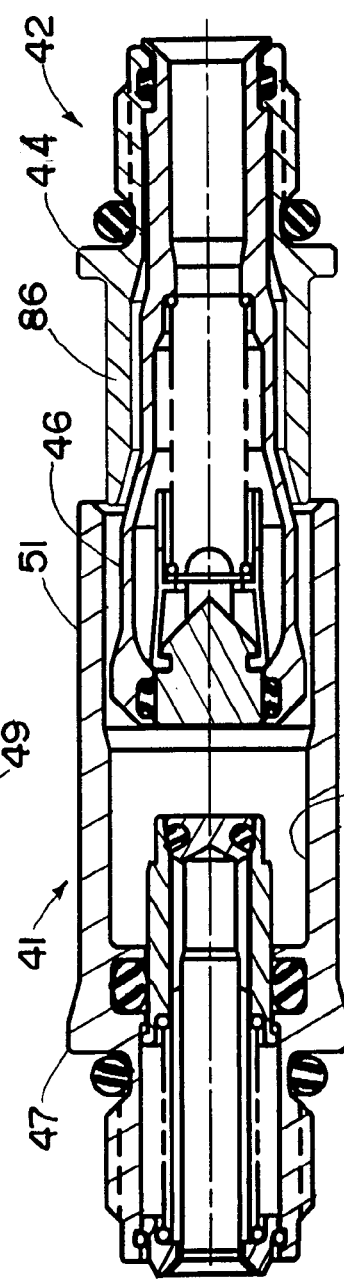
FIG. 4 is a cross-sectional view of the fluid coupling of FIG. 3 after initial alignment and just prior to final alignment.

The initial rough and final alignment followed by a small tolerance alignment is illustrated in FIGS. 3-5. In FIG. 3, the male and female couplers are shown just prior to engagement. Upon further movement of the two halves together, the spud on the female coupling will engage and telescope over the nipple providing initial alignment within a first tolerance range, such as between about ±0.2 inch and about ±0.05 inch. The leading end of the spud may be internally beveled to facilitate guiding of the nipple into the spud for subsequent passage into the socket. In FIG. 4, the two halves have been brought together to a point where final alignment will be initiated. Upon further axial movement of the halves toward one another, the spud will engage and telescope over the locating extension 86 of the male coupler body to coaxially align the male and female coupler bodies 41 and 47 within a second tolerance smaller than the first tolerance, such as between about ±0.01 inch and about ±0.05 inch, more particularly between about ±0.015 inch and ±0.025 inch, and still more particularly about ±0.015 inch to about ±0.020 inch. The leading end of the locating extension 51 preferably is beveled to facilitate alignment of the spud with the locating extension. In FIG. 5, the coupling halves have been fully mated with a preferred axial overlap of the locating spuds (extensions) at least equal the diameters of the locating spuds (extensions).

FIG. 7 shows a modified version of the coupling shown in FIG. 6. Accordingly, the same reference numerals are used to designate corresponding parts. The coupling 92 of FIG. 7 is identical to the coupling 40 of FIG. 6 except for different diameters of the locating spuds/extensions 51 and 86 that can function to prevent a coupling half from mating with the wrong coupling halve. The locating extension of the male coupler body also has an annular groove 93 formed in the locating surface thereof which can facilitate telescopic movement thereover of the locating spud of the female coupler body.

Figure 8:
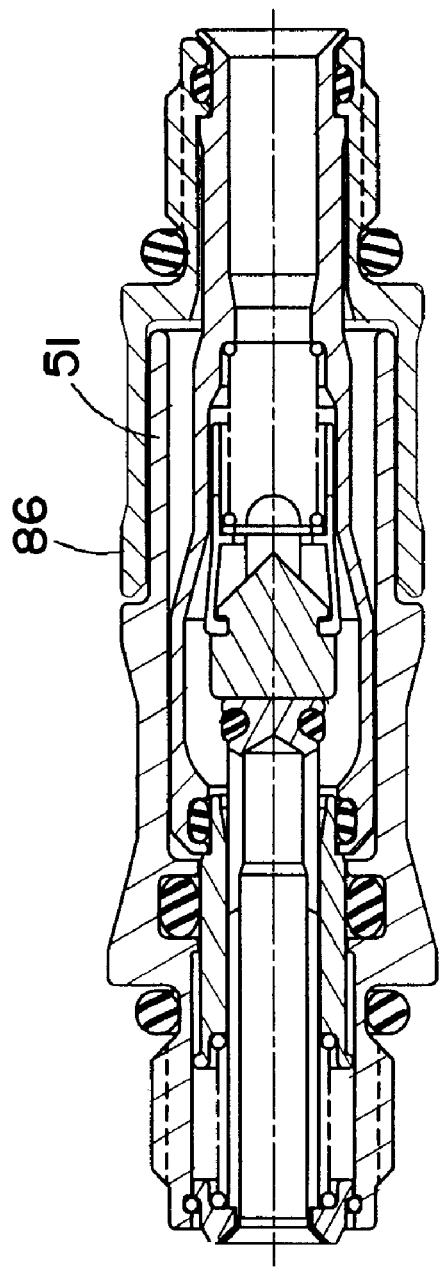
FIG. 8 is a cross-sectional view of another exemplary fluid coupling according to the principles of the invention.
Figure 9:
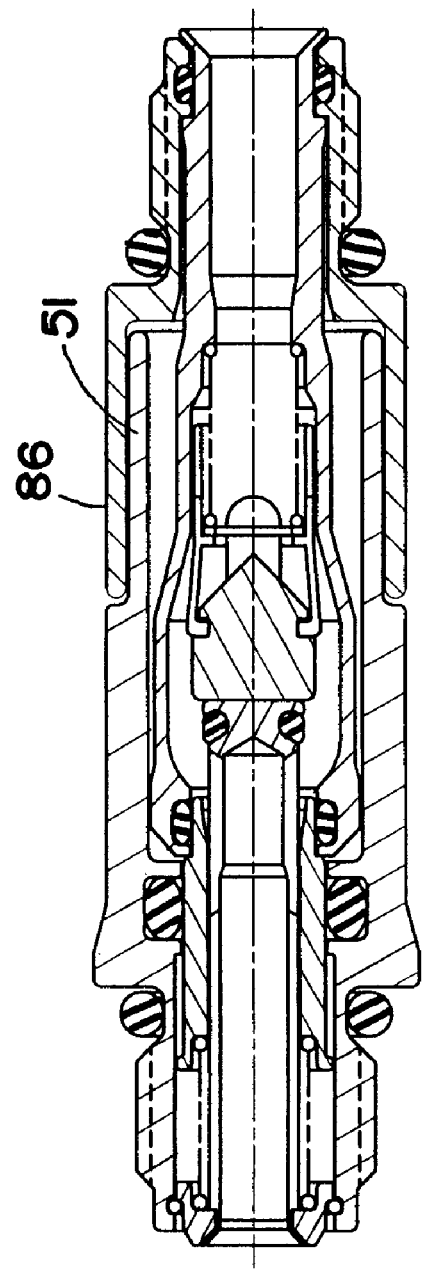
FIG. 9 is a cross-sectional view of a modified version of the fluid coupling shown in FIG. 8.

FIG. 8 shows another embodiment of a fluid coupling according to the invention. The coupling 98 of FIG. 8 is identical to that of FIG. 6 except the locating spuds/extensions 51 and 86 on the male and female coupler bodies are diametrically sized such that the locating spud/extension 86 of the male coupler body telescopes over rather than into the locating spud/extension 51 of the female coupler body. Again the leading ends of the spuds/extensions are beveled to guide the spuds/extensions into final alignment. FIG. 9 is a modified version of the coupler of FIG. 8, only the diameters of the spuds/extensions 51 and 86 being varied for the reason noted above with respect to the coupler shown in FIG. 7.

Figure 10:
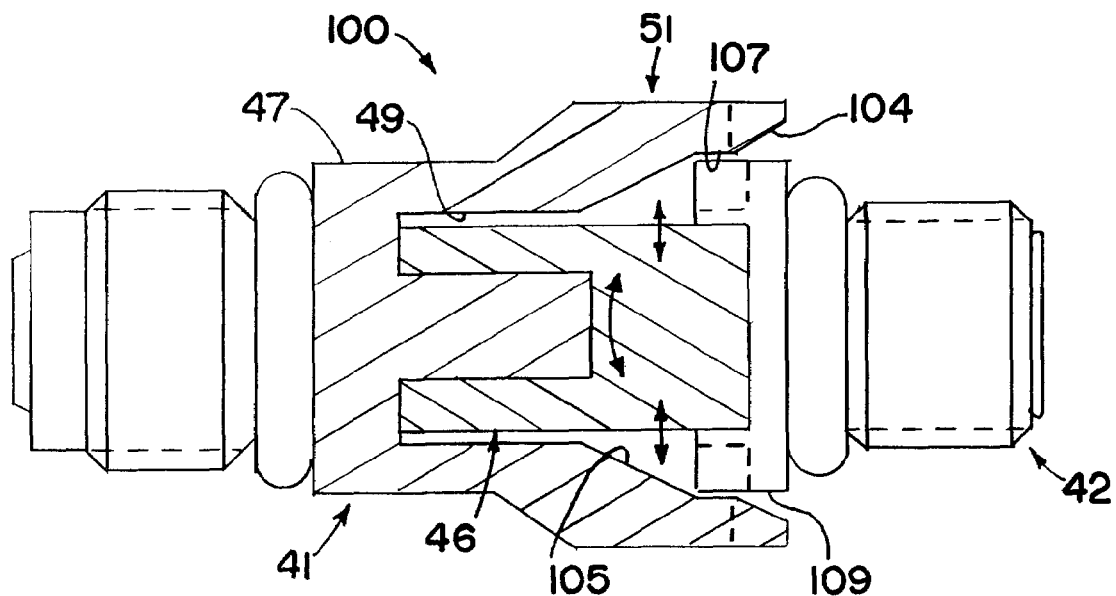
FIG. 10 is a schematic cross-sectional view of yet another exemplary fluid coupling according to the principles of the invention.

FIG. 10 shows yet another embodiment of a fluid coupling 100 according to the invention. In FIG. 10, the socket 49 of the female coupler 41 and the nipple 46 of the male coupler 42 are schematically illustrated and may, for example, have the construction and associated valving described above in reference to FIGS. 3-6. The locating spud/extension 51 of the female coupler body 47 differs from those previously described in that it has a leading bevel 104 and a smaller diameter bevel 105 separated by a short distance by a cylindrical location portion or land 107. The locating member of the male coupler body also is different, in that is formed with an annular cylindrical centering surface or land 109 at the outer diameter of the male coupler body.

When coupling the coupling halves together, the nipple will enter the larger diameter centering bevel and then past the centering land and into the smaller and axially longer centering bevel that guides the end of the nipple into the socket in the female coupler. As this is occurring the male coupler body will enter the larger diameter centering bevel of the female coupler body whereby it will be guided into the centering land. The nipple, which is floating in its internal seals, can easily slip inside the centering land of the female coupler body and into the smaller diameter centering bevel. When the male coupler body bottoms in the female coupler body, the coupler bodies will be closely aligned. Any side load on the nipple will then be alleviated to avoid the potential for leaks. The relative sizes of the inner and outer diameters of the centering surfaces will determine the accuracy of the alignment, as is also the case with the other herein described embodiments.

Figure 11:
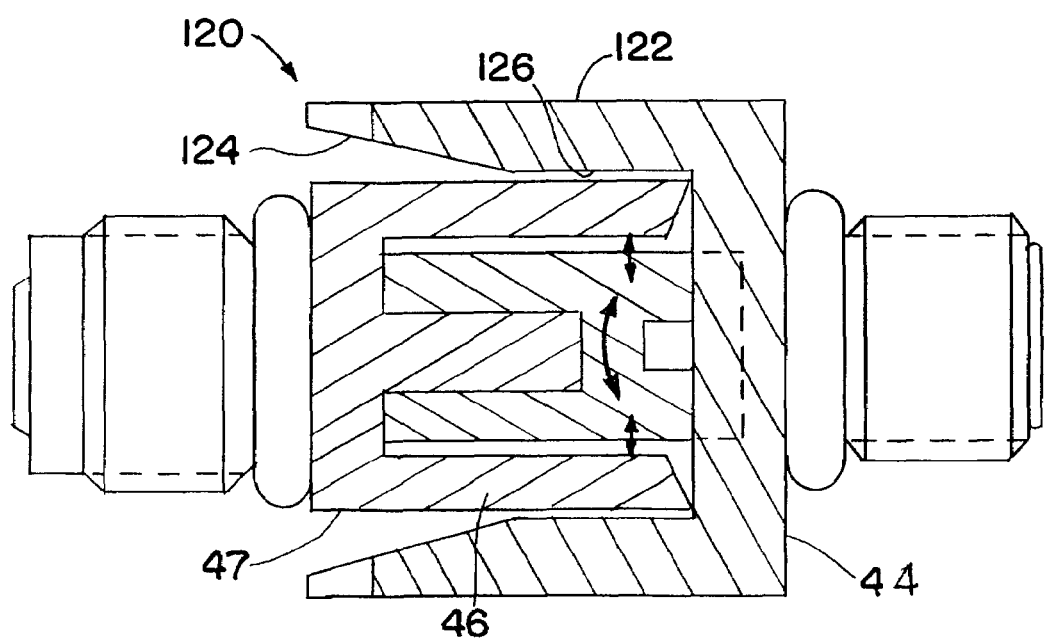
FIG. 11 is a schematic cross-sectional view of still another exemplary fluid coupling according to the principles of the invention.

FIG. 11 shows a fluid coupling 120 wherein an locating spud/extension 122 is implemented on the male coupler body 44. The locating spud/extension is concentric with and surrounds the nipple 46 of the male coupler. The locating spud/extension has a bevel 124 at its leading end for engaging and guiding female coupler body 47. The bevel terminates at a cylindrical locating surface or land 126. During coupling of the coupling halves, the leading end of the female coupler body will engage the centering bevel of the male coupler body. This will center the female coupler body for passage into the centering land which closely aligns the coupler bodies. As in the case of the FIG. 10 embodiment, the socket of the female coupler and the nipple of the male coupler are schematically illustrated and may, for example, have the construction and associated valving described above in reference to FIGS. 3-6.

The principles of the present invention can be applied in various types of couplings, as will be appreciated by those skilled in the art. The present invention, however, is particularly applicable to electronic module and rack assemblies as above described.

Although the invention has been shown and described with respect to a certain embodiment or embodiments, it is obvious that equivalent alterations and modifications will occur to others skilled in the art upon the reading and understanding of this specification and the annexed drawings. In regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid coupling for providing a fluid connection between an electronic module and a rack having an electrical connector to which the electronic module is connected, comprising a male coupler and a mating female coupler, wherein the male coupler includes a male coupler body and a nipple, the female coupler includes a female coupler body and a socket for receiving the nipple to establish a sealed fluid flow path between the male and female couplers when the couplers are connected together, at least one of the nipple and socket is mounted in the respective coupler body for limited transverse movement relative to the respective coupler body, and at least one of the couplers includes an axially extending spud that will initially telescopically engage the other coupler to initially coaxially align the male and female couplers within a first tolerance range and then to telescopically engage an alignment surface on the coupler body of the other coupler to coaxially align the male and female coupler bodies within a second tolerance smaller than the first tolerance.

2. A fluid coupling as set forth in claim 1, wherein the other coupler includes a receptacle for telescopically receiving and concentrically positioning the spud.

3. A fluid coupling as set forth in claim 1, wherein the spud telescopes over the alignment surface of the other coupler body.

4. A fluid coupling as set forth in claim 1, wherein the spud is a cylindrical axial extension of the respective coupler body.

5. A fluid coupling as set forth in claim 1, wherein is spud is concentric with the center axis of the respective coupler body.

6. A fluid coupling as set forth in claim 1, wherein the nipple includes a normally closed poppet valve that is openable through interaction with the female coupler when the nipple is coupled in the socket.

7. A fluid coupling as set forth in claim 6, wherein the socket includes a normally closed poppet valve that is openable through interaction with the nipple when the nipple is coupled in the socket.

8. A fluid coupling as set forth in claim 1, wherein the spud is provided on the female coupler body and initially engages the nipple of the male coupler body to initially coaxially align the male and female coupler bodies.

9. A fluid coupling as set forth in claim 1, wherein the alignment surface on the coupler body of the other coupler is formed on an axially extending spud forming an axial extension of the coupler body of the other coupler, and the axially telescoping spuds telescopically engage one another to coaxially align the male and female coupler bodies within the second tolerance.

10. A fluid coupling as set forth in claim 9, wherein one of the spuds forms a tubular pin structure and the other forms a tubular receptacle structure for receiving the pin structure.

11. A fluid coupling as set forth in claim 1, wherein at least one of the coupling bodies include a threaded end portion for securement in a port of an external body.

12. A fluid coupling as set forth in claim 1, in combination with the electronic module and the rack, one of the couplers being provided on the electronic module and the other on the rack.

13. A combination as set forth in claim 12, wherein the electronic module includes at an edge thereof an electrical connector for mating with the electrical connector of the rack, and the fluid coupling is provided at the module edge at one end of the electrical connector of the module and another fluid coupling is provided at an opposite end of the electrical connector of the module.

14. A combination as set forth in claim 13, wherein the fluid couplings function to align the electrical connectors of the module and rack within the second tolerance.

15. A male coupler for use in the fluid coupling of claim 1.

16. A female coupler for use in the fluid coupling of claim 1.

17. A fluid coupling for providing a fluid connection between an electronic module and a rack having an electrical connector to which the electronic module is connected, comprising a male coupler including a male coupler body and a mating female coupler including a female coupler body, the male coupler body and female coupler bodies including respective alignment devices telescopically engageable with one another for coaxially aligning the male and female coupler bodies, and the male and female couplers respectively including radially inwardly of the alignment devices a nipple and a socket for sealingly receiving the nipple to establish a sealed fluid flow path between the male and female couplers when connected together.

18. A fluid coupling device for providing a fluid connection between an electronic module and a rack having an electrical connector to which the electronic module is connected, comprising a male coupler and a mating female coupler, the male coupler including a nipple, the female coupler including a socket for receiving the nipple to establish a sealed fluid flow path between the male and female couplers when connected together, the female coupler having an axially extending alignment spud protruding axially beyond the socket, the male coupler including an alignment body from which the nipple projects, and the spud protruding axially beyond the socket such that it will initially engage therein the nipple of the male coupler to initially coaxially align the male and female couplers within a first tolerance range prior to contact between the nipple and socket and then to engage the alignment body of the male coupler to coaxially align the male and female couplers within a second tolerance closer than the first tolerance.

19. A fluid coupling device for providing a fluid connection between an electronic module and a rack having an electrical connector to which the electronic module is connected, comprising a male coupler and a mating female coupler, the male coupler including a nipple, the female coupler including a socket for receiving the nipple to establish a sealed fluid flow path between the male and female couplers when connected together, the female coupler having an axially extending alignment spud located radially outwardly of the receptacle and protruding axially beyond the socket, and the male coupler including a body having an alignment surface for cooperating with an alignment surface on the spud to coaxially align the male and female couplers during axial mating of the male and female couplers, the alignment surface on at least one of the spud and body having a leading beveled surface and a trailing centering surface respectively for engaging the alignment surface on the other of the spud and body to initially coaxially align the male and female couplers within a first tolerance range prior to contact between the nipple and socket and then to finally coaxially align the male and female couplers when the nipple and a socket are sealingly coupled together.

* * * * *